April 10, 1945.  N. B. GREEN  2,373,391
PHOTOGRAPHIC CAMERA
Filed Oct. 10, 1942
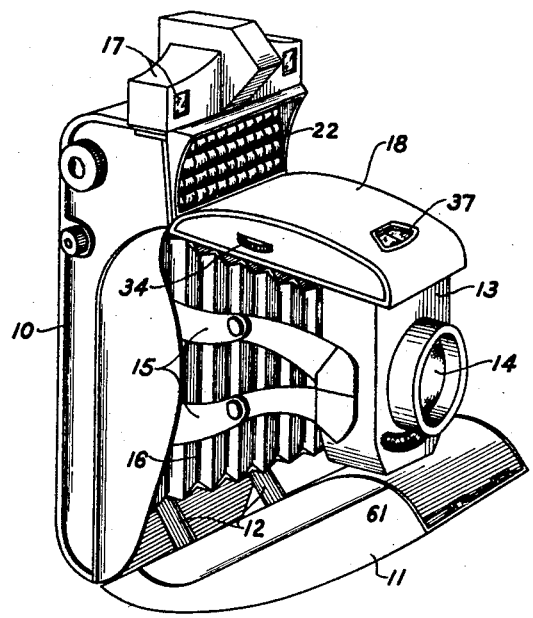
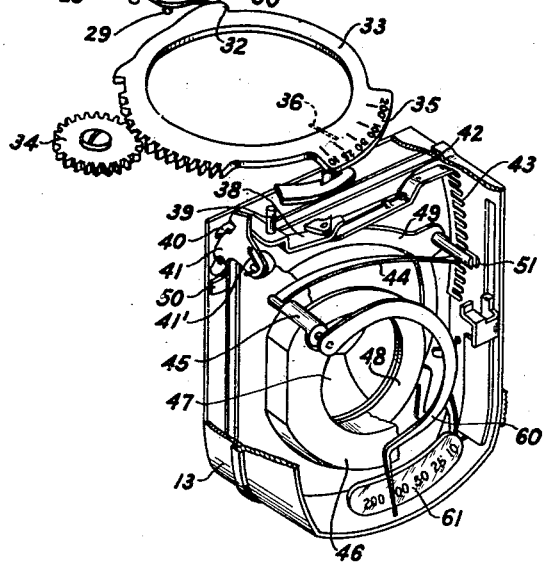
Newton B. Green
INVENTOR Patented Apr. 10, 1945

2,373,391

UNITED STATES PATENT OFFICE 2,373,391

PHOTOGRAPHIC CAMERA

Newton B. Green, Rochester, N. Y., assignor to Eastman Kodak Company, Rochester, N. Y., a corporation of New Jersey Application October 10, 1942, Serial No. 461,548

5 Claims. (Cl. 95—10)

This invention relates to photographic cameras, and more particularly to cameras provided with a light-sensitive device for determining the setting of the exposure control devices.

It is often desirable when taking action pictures, where the faster shutter speeds are necessary to stop motion, to be able to rapidly and accurately determine just what is the maximum shutter speed one can use under prevailing light conditions and obtain a satisfactory exposure.

So-called automatic cameras in which the setting of the shutter is automatically made by adjustment of the diaphragm, or vice versa, have been made to facilitate correct exposure control, but to my knowledge no camera has ever been provided with means for automatically indicating the maximum shutter speed which can be used under prevailing light conditions.

Therefore, it is an object of the present invention to provide a camera including means for automatically determining and indicating the maximum shutter speed that can be used under prevailing light conditions.

Another object of the invention is the provision of means of the type set forth which may be adapted to a camera having no automatic exposure control means, or one having an automatic exposure control means.

A further object is the provision of a means for automatically indicating the maximum shutter speed that can be used under prevailing light conditions, and which includes a light-sensitive cell, an electric meter connected in circuit with said cell, and a shutter speed indicating scale so arranged that the pointer of said meter is adapted to traverse the same.

And still another object of the present invention is the provision of an automatic maximum shutter speed indicating means which can be applied to a camera having an automatic exposure control mechanism in such a way that part of said automatic exposure control mechanism can constitute a part of the shutter speed indicating means and the operation of one will not affect the operation of the other.

The novel features that I consider characteristic of my invention are set forth with particularity in the appended claims. The invention itself, however, both as to its organization and its methods of operation, together with additional objects and advantages thereof, will best be understood from the following description when read in connection with the accompanying drawing, in which, Fig. 1 is a perspective view of a particular type of camera incorporating the invention, and Fig. 2 is a fragmentary perspective view of the camera parts embodying the working elements of the invention.

Like reference characters refer to corresponding parts throughout the drawing.

Generally, the present invention comprises a shutter speed indicating scale in front of the shutter housing, or any other accessible place on the camera, which is mounted over the pointer of a micro-ammeter energized by the output of a light-sensitive cell to which the transmission of light may be varied so as to indicate the maximum shutter speed usable under a given level of illumination, or under prevailing light conditions.

The invention may readily be incorporated on any camera whether or not it is one of the type having a built-in automatic exposure control system, as will be apparent from the following description, but for the purpose of explaining the invention it will now be described as embodied in a well-known type of still camera of the folding type and incorporating an automatic exposure control mechanism.

In the embodiment illustrated in the drawing, the camera has a body portion 10 with a bed 11 hinged thereto and adapted to unfold to a position determined by bed braces 12 as shown. Enclosed housing 13 constitutes the lens board and contains a shutter and diaphragm assembly for its lens 14. The housing 13 is attached to the camera body 10 by a conventional spring actuated linkage 15 and rendered light tight by a bellows 16. The camera is shown provided with a range finder 17 which is preferably coupled in any well-known manner, not shown, to the focusing movement of the lens 14. The setting, release, and timing elements for the shutter are assembled within a supplemental cover 18 hinged to the camera body 10 above the bellows 16 and movable to the position shown in Fig. 1 when the camera is opened, by reason of its sliding connection with the lens board 13.

The manner in which the camera folds and unfolds, the shutter and its control, and the adjustment of the diaphragm are fully described and illustrated in U. S. Patent 2,124,886, of July 26, 1938, and 2,117,971, of May 17, 1938, respectively, both issued in the name of Joseph Mihalyi, and will be referred to herein only as much as is necessary for a complete understanding of the present invention.

As fully set forth in U. S. Patent 2,184,017, which issued December 19, 1939, to Joseph Mihalyi, and as shown in the instant Fig. 2, this particular camera may include a light-sensitive cell 19 which with its multiple chamber baffle 20 and movable grid 21 is positioned behind a plurality of lenses 22 carried in the front of the camera body and above the supplemental cover 18. The grid 21 is biased in a downward direction by a suitable spring member 23 and is held against the bias of the spring 23 by an arm 24 which bears against a cam surface 25 provided on the lower edge of the grid 21.

The baffle members 20 have bent-over end portions 26 which cover approximately one-half of the front of the baffle chamber, and cooperate with the movable grid 21 to exclude all light from the chamber when the grid 21 is in its extreme downward position as determined by supporting members 27 projecting through slots 28 provided in the grid. Each of the lenses is chosen having a focal length substantially equal to its distance from the cell 19 and is positioned immediately in front of the grid 21 so that the variable opening formed by the end portion 26 and the grid 21 is close enough to the diaphragm plane of a lens 22 to act as a diaphragming means.

The arm 24 which bears against cam 25 is mounted for rotation on a pin 29 and has an extending lever 30 which by means of a spring 31 is resiliently held against cam 32 carried by a ring 33 of the shutter speed setting mechanism. The ring 33 may be rotated by a gear 34 for adjusting the setting of the shutter, which setting is indicated by a scale 35 and an index 36 and may be rendered visible to the camera user by providing a transparent window 37 in the supplemental cover 18.

As fully set forth in the above-noted patent, adjustment of the ring 33 determines the exposure period of the shutter and a self-controlled meter determines the aperture of the lens during the exposure. This mechanism includes a lever 38 which is rotated about its pivot 39 upon operation of the camera release, not shown, and thereby disengaging its end 40 from a latch member 41 and, through spring 42, swings forward a comb member 43 to entrap a pointer 44 in the position determined by a meter coil 45 as energized by the light-sensitive cell 19.

The coil 45 has a magnet 46 which surrounds the optic axis of the lens 14 and is carried in the housing 13 along with the diaphragm having leaves 47 and a ring 48 adjustable for altering its setting as is well known. For adjusting the ring 48, a V-shaped arm 49 is provided having one prong connected to the ring 48 and the prong pivoted, not shown, near its end 50. This diaphragm lever 49 is biased by means, not shown, tending to rotate it in a clockwise direction to reduce the aperture of the objective lens. The lever 49 is normally held in its extreme clockwise position by the end of latch 41 bearing against its end 50.

When the lever 38 is rotated to trap the pointer 44 and remove the end 40 of the lever 48 from engagement with the latch 41, a spring 41' rotates the latch 41 out of the path of the end 50 of the diaphragm lever 49 and the biasing means rotates the lever 49 in a clockwise direction until a bifurcated pin 51 carried by the lever 49 engages the entrapped pointer 44 after which the exposure is made at the aperture determined by the pointer 44 and for an interval determined by the shutter setting of the ring 33 as all described in the above identified patents.

The above-described camera and its associated parts are well known as set forth, and per se form no part of the present invention except insofar as parts thereof constitute essential parts of the present invention now to be specifically disclosed, or the camera and the present invention constitute a new combination.

In accordance with the present invention, the front of the lens board housing 13 is provided with an opening covered by a transparent shutter speed indicating scale 61, this position of the scale being especially desirable because it is readily accessible for observation by the camera user. Fixed to the coil 45 of the electric meter is a second pointer 60 which is adapted to traverse said shutter speed indicating scale as the output of the cell 19 is varied. It will be observed that the arm of the pointer 60 is curved to encircle the optical axis of the camera, and this curve is of such magnitude that the arm of the pointer will lie outside of the optical axis of the lens when the pointer assumes its extreme position to the left of the scale 61, looking at Fig. 2.

In order to obtain an indication of the maximum shutter speed which can be used under prevailing light conditions, the light-sensitive cell should be opened wide to permit the maximum amount of light to be transmitted thereto. Then the electrical output of the cell will cause the coil 45 to be rotated clockwise in the present instance, and the shutter speed indicated by the pointer 60 will be the maximum that can be used with a full open diaphragm. Some means must, therefore, be provided for optionally adjusting the cell shielding means to a position where the full effective area of the cell is subjected to the prevailing light conditions.

To this end, in the camera in question this is easily done by balancing the cell 19 so as to have it working at its full effective area when the grid 21 is fully raised. This condition is assumed when the shutter speed setting ring 33 is moved to a 1/25 of a second exposure, because at this slow shutter speed the cell 19 should call for the minimum diaphragm opening and hence will require its greatest output under prevailing light conditions. If, therefore, the ring 33 is optionally turned to a 1/25 of a second exposure by manual operation of gear 34 the full effective area of the cell 19 will be subjected to the prevailing light conditions, as shown, and the meter pointer 60 will be rotated in a clockwise direction under the transparent scale 61 and will indicate the maximum shutter speed usable under the existing level of illumination. If for reason the indicated maximum speed is chosen, the speed setting ring 33 is then set to the corresponding speed on scale 35 and an exposure at the largest f value, or wide open diaphragm, would be obtainable with the indicated top speed.

Although the shutter setting ring 33 of this particular camera is particularly adapted for optionally opening the cell 19 up wide, it is pointed out that a means entirely separate from this ring could be provided for this purpose if so desired. It will be appreciated that the present invention is particularly adapted for use with the camera in question because, combined as disclosed, a plurality of parts of the camera exposure control mechanism is made use of in the present maximum shutter speed indicating mechanism without affecting the normal operation of either mechanism.

While for the purpose of disclosure I have chosen to show my invention in combination with a camera having a particular type of exposure control mechanism with which it is particularly adapted for use, it is pointed out that the present invention is not limited for use with such a camera. It could just as well be used with a camera having any particular type of light-sensitive cell operated exposure control, or it could be used with a camera having no exposure control at all. For example, if it were desired to apply the present invention to a camera having no light-sensitive cell exposure control, it would be necessary to provide such a camera with a light-sensitive cell balanced against the particular maximum relative aperture of the lens which the camera might be equipped with, an electrical meter connected in circuit with said cell, a shutter speed indicating scale over which the pointer of the meter would traverse, and means for optionally opening said cell to full light transmission when desired. Inasmuch as light-sensitive cells tend to deteriorate when continually subjected to strong light, it is preferable to have the cell provided with a light-shielding means which is normally operative to cover the cell and capable of being opened when desired. It is also pointed out that while I have shown the maximum shutter speed indicating scale located in a position which is particularly useful with the camera used for disclosure purposes, the relative position of the meter and scale could be altered to suit any of the requirements of any camera without going beyond the scope of the present invention.

Although I have shown and described certain specific embodiments of my invention, I am fully aware that many modifications thereof are possible. My invention, therefore, is not to be limited to the precise details and construction shown and described but is intended to cover all modifications coming within the scope of the appended claims.

Having thus described my invention what I claim as new and desire to secure by Letters Patent of the United States is:

1. In a photographic camera, the combination with a camera casing, an adjustable shutter, means for adjusting said shutter, an adjustable diaphragm inaccessable for manual operation, means for adjusting said diaphragm including a light-sensitive cell mounted on said casing, an adjustable means for varying the transmission of light to said cell, an electric meter in circuit with said cell, and including a pointer movable in response to the variations in the amount of output of said cell, of a shutter speed scale disposed relative to said pointer to be traversed thereby, and arranged whereby the pointer moves from the lower shutter speeds to the higher shutter speeds as the output of the cell is increased, and manually operable means including said shutter setting means for optionally setting said adjustable means to subject said cell to the maximum prevailing light conditions, whereby said pointer will indicate on said shutter speed scale the maximum shutter speed suitable with prevailing light conditions and a wide open diaphragm.

2. A photographic camera according to claim 1, and in which the electrical meter complete, and the pointer partly, encircle the optical axis of the camera, and the shutter speed scale is disposed on the front of the camera and to one side, but adjacent, the optical axis.

3. In a photographic camera, the combination with an objective, an adjustable shutter and an adjustable diaphragm for controlling the exposure through said objective, a light-sensitive cell, an adjustable means independent of said diaphragm for varying the transmission of light to said cell, an electric meter in circuit with said cell and including a first pointer for determining the opening to which the diaphragm is to be adjusted, means for altering the speed setting of said shutter and connected to said cell adjusting means for varying the output of said cell in accordance with the shutter speed setting, of a second pointer on said meter movable in response to variations in the output of said cell, a shutter speed scale separate from the shutter mechanism disposed relative to said second pointer to be traversed thereby, and arranged whereby the pointer moves from the lower shutter speeds to the higher shutter speeds as the output of the cell is increased, and manually operable means for optionally setting said adjustable means to subject said cell to the maximum prevailing light conditions, whereby said second pointer will indicate on said shutter speed scale the maximum shutter speed suitable with prevailing light conditions and a wide open diaphragm.

4. A photographic camera according to claim 3, and in which said manually operable means for optionally setting said adjustable means, and means for altering the setting of the shutter, are both actuated by the same control member.

5. A photographic camera according to claim 3, and in which said manually operable means for optionally setting said adjustable means, and means for altering the speed setting of the shutter, includes a plurality of parts common to both.

NEWTON B. GREEN.